(12) United States Patent
Gryc et al.

(10) Patent No.: US 8,738,361 B2
(45) Date of Patent: May 27, 2014

(54) SYSTEMS AND METHODS FOR EXTRACTING PATTERNS FROM GRAPH AND UNSTRUCTERED DATA

(75) Inventors: Wojciech Gryc, Ontario (CA); Richard Lawrence, Yorktown Heights, NY (US); Yan Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/496,252

(22) Filed: Jul. 1, 2009

(65) Prior Publication Data

US 2011/0004463 A1 Jan. 6, 2011

(51) Int. Cl.
*G06F 17/27* (2006.01)
(52) U.S. Cl.
USPC .................................................. 704/9
(58) Field of Classification Search
None
See application file for complete search history.

(56) References Cited

U.S. PATENT DOCUMENTS

2009/0094231 A1* 4/2009 Marvit et al. .............. 707/5
2011/0072052 A1* 3/2011 Skarin et al. ........... 707/794

OTHER PUBLICATIONS

Blei et al, "Latent Dirichlet Allocation," Journal of Machine Learning Research 3, (2003), pp. 993-1022.*
Alsumait, L., et al., "On-Line LDA: Adaptive Topic Models for Mining Text Streams with Applications to Topic Detection and Tracking", ICDM '08 Proceedings of the 2008 Eighth IEEE International Conference on Data Mining, 2008, pp. 3-12.*
Chakrabarti et al., "Graph Mining: Laws, Generators, and Algorithms", SCM Computing Surveys, vol. 38(1):2, Mar. 2006.

* cited by examiner

*Primary Examiner* — Angela A Armstrong
(74) *Attorney, Agent, or Firm* — Scully, Scott, Murphy & Presser, P.C.; Daniel P. Morris, Esq.

(57) ABSTRACT

A computing system receives input data having both graph and unstructured data and computes a current log likelihood of the input data. The computing system compares the current log likelihood with a previous log likelihood of the input data. If the current log likelihood is larger than the previous log likelihood, the computing system update topic modeling parameters, community modeling parameters, and the link generation parameter until the computing system obtains a maximal value of the log likelihood of the input data. Then, the computing system creates a graph indicating topic similarity between the input data based on the topic modeling parameters, creates another graph indicating community similarity between entities associated with the input data based on the community modeling parameters, and predicts a link existence between input data or entities based on the link generation parameter, the topic modeling parameter and the community modeling parameter.

14 Claims, 5 Drawing Sheets

SYSTEMS AND METHODS FOR EXTRACTING PATTERNS FROM GRAPH AND UNSTRUCTERED DATA

BACKGROUND

Blog analysis refers to a set of technologies of organizing, analyzing and extracting useful information from blogs. Andreas Aschenbrenner et al., "Blog mining in a corporate environment", September 2005, incorporated as a reference herewith, describes blog analysis technique in detail.

Web mining refers to an application of data mining techniques to discover pattern from websites. The web mining can be divided into three different types: 1) web usage mining; 2) web content mining; and 3) web structure mining. Web usage mining is an application that uses data mining to analyze and discover intersecting patterns of user's usage data on websites. Web content mining is a process to discover useful information from text, image, audio or video data in the websites. Web structure mining is a process of using graph theory to analyze connection structure of websites.

Social networks such as Facebook® and Myspace® include entity relation information such as who is a friend of whom as well as entity property information such as posts, comments and messages posted by bloggers and/or owners of Facebook® pages. While using the social networks, users may be interested in one or more of: which groups of people belongs to a same community and which groups of companies have close partnerships. (An "entity" refers to a user or a company.)

Traditional solutions to obtaining these information (e.g., which groups of people belongs to a same community and which groups of companies have close partnerships) is mostly based on use of graphical and graph theory techniques, i.e. the traditional solutions are casted as graph-partition problems and algorithms such as a minimal cut (the number of edges crossing a cut is minimal). A major drawback of the traditional solutions is that the traditional solutions treat all edges as the same, which usually is not applicable in real applications. For example, in blog analysis, a link between two posts sharing little or no content similarity usually happens when a blogger A is a friend of a blogger B. This type of links (i.e., links indicating friendship) should not be treated the same as links between posts with content similarity, in which case the two bloggers simply discuss same topics without even knowing each other in person. Furthermore, missing links between two posts with content similarity indicates more information (e.g., information indicating that two bloggers do not know each other) than missing links with no content similarity. A missing link refers to a link or edge that represents a relationship (e.g., friendship or partnership) between entities but somehow is unobserved due to privacy issues or data collecting processes (e.g., data mining process).

Hence, it is desirable that a method and/or system perform discovering communities or groups of entities using mathematical techniques that treat edges between entities of different relationships (e.g., content similarity or community similarity (i.e., friendship)) differently.

SUMMARY

The present invention is directed discovering communities or groups of entities, and, more particularly, the present invention relates to discovering relationships between entities.

In one aspect, a method and a system is provided for identifying or determining communities or clustering entities using mathematical techniques that treat edges between entities of different relationships (e.g., content similarity or community similarity (i.e., friendship)) differently.

In one embodiment, there is provided a method implemented in a computer system for discovering a relationship between entities. The method comprises: receiving input data W representing a word vector matrix and input data G representing a link graph matrix; computing a current log likelihood of the input data W and G, the current likelihood of the input data being a probability distribution function of parameters, the parameters representing topic similarity between unstructured texts of the entities and community similarity between the entities; comparing the current log likelihood of the input data and a previous log likelihood of the input data computed previously; updating values of the parameters, if the current log likelihood is larger than the previous log likelihood; or constructing at least one graph based on the updated values of the parameters, if the current log likelihood is less than or equal to the previous log likelihood, the at least one graph indicating the relationship between the entities, wherein a program using a processor unit executes one or more of said computing comparing, updating, and constructing.

In one embodiment, there is provided a computer-implemented system for uncovering communities. The system comprises: a computer-implemented topic modeling module for receiving documents as inputs, extracting topics in the documents, and constructing a first graph representing content similarities between the documents; a computer-implemented community modeling module for uncovering relationships between entities associated with the documents and constructing a second graph representing the relationships between entities; and a computer-implemented link modeling module for communicating with the topic-modeling module and the community modeling module, predicting whether an edge in the first graph will be formed based on the uncovered relationship, predicting whether an edge in the second graph will be formed based on the extracted topics, and constructing an entity relationship graph based the first graph and the second graph.

In one embodiment, there is provided a computer system for discovering a relationship between entities. The computer system comprises a memory and a processor in communications with the memory, wherein the computer system is configured for performing a method comprising: receiving input data W representing a word vector matrix and input data G representing a link graph matrix; computing a current log likelihood of the input data W and G, the current likelihood of the input data being a probability distribution function of parameters, the parameters representing topic similarity between unstructured texts of the entities and community similarity between the entities; comparing the current log likelihood of the input data and a previous log likelihood of the input data computed previously; updating values of the parameters, if the current log likelihood is larger than the previous log likelihood; or constructing at least one graph based on the updated values of the parameters, if the current log likelihood is less than or equal to the previous log likelihood, the at least one graph indicating the relationship between the entities.

In a further embodiment, the comparing and the updating perform functions that can be repeated until the current log likelihood becomes less than or equal to the previous log likelihood.

In a further embodiment, the relationship comprises: a partnership between the entities, a friendship between the entities, and a similarity (e.g., content similarity or community similarity) between the entities.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

One embodiment of the present invention treats community or grouping information of an entity as a hidden variable, whose value and similarity measure between entities are extracted from unstructured texts (i.e., text description of an entity; e.g., posts, comments, etc.). The community or grouping information may determine whether there is an edge between two entities. The hidden variable refers to variables that are not directly observed in data collecting process, but conceptually exist. For example, users may know that there should be friendship information (e.g., a link indicating friendship) between Facebook® page owners or bloggers. However, the friendship information may not be shown or illustrated due to privacy or other issue(s).

According to this embodiment, values of hidden variables can be learned using following method:
1. Initialize values of parameters for topic modeling of the unstructured texts and the values of parameters for an edge generation: topic modeling refers to extract topics discussed in the unstructured texts. For example, an article on Steelers vs. Colts NFL games can be classified as a topic "sports" and an article on presidential election can be classified as a topic "politics". The topic modeling is an automatic process that summarize the topics in the document collecting process and which document belongs to which topics. The edge generation refers to predicting a link or edge in a graph (e.g., a graph generated from the topic modeling). The parameters include, but are not limited to: a first prior probability matrix $\alpha$, a topic representation matrix $\beta$, a document topic association matrix $\theta$, a second prior probability matrix k, an entity community association matrix $\mu$, and a link generation matrix $\tau$. (These parameters are described in detail herein below.)
2. Repeat until converge (i.e., stop repeating when the parameter values maximize a log likelihood of inputs (e.g., a word vector matrix representing the unstructured texts; the word vector matrix is described in detail herein below)). The likelihood refers to a probability that observations appear. For example, when flipping a coin, a following probability can be assumed: P(Face="head")=P(Face="tail")=0.5. When flipping the coin twice, "head" and "head" can be observed. Then, the likelihood of "head" and "head"=P(Face="head")*P(Face="head")=0.25. The log likelihood refers to a log (e.g., $\log_2$ or $\log_{10}$) of the likelihood.
2a) Estimate an expected value of the entity community association matrix $\mu$ under a current parameter setting. (How to estimate the expected value of the $\mu$ is described in detail herein below.)
2b) Update the values of parameters ($\alpha$, $\beta$, $\theta$) for the topic modeling. (How to update the values of parameters is described in detail herein below.)
2c) Update the values of parameters ($\tau$) for the edge generation. (How to update the values of parameters is described in detail herein below.)

This embodiment of the present invention that utilizes a mathematical technique treats edges between entities of different similarities (e.g., content similarity or community similarity) differently, as opposed to traditional solutions which treat all edges equally. Thus, this embodiment is able to uncover communities having community similarity. For example, this embodiment of the present invention captures relationships indicated by cases where a blogger A links to his friend, blogger B, even without content similarity. A further embodiment of the present invention predicts a link, i.e., predict whether a link will form in a future, based on relationships formed between entities. For example, a relationship (e.g., friendship or partnership) is formed by social or commercial behavior. The relationship may be formed from a function of topic similarity (e.g., content similarity between two posts) and community similarity (e.g., friendship between two bloggers). The function can be linear or any other form. By fitting the inputs (e.g., a word vector matrix representing the unstructured texts) to each function, the most appropriate function describing the input data is found and therefore understand and predict how the relationship is formed based on the most appropriate function. An example of the function is a linear function with a weight of 1 for topic similarity and a weight of 2 for community similarity.

Figure 1:
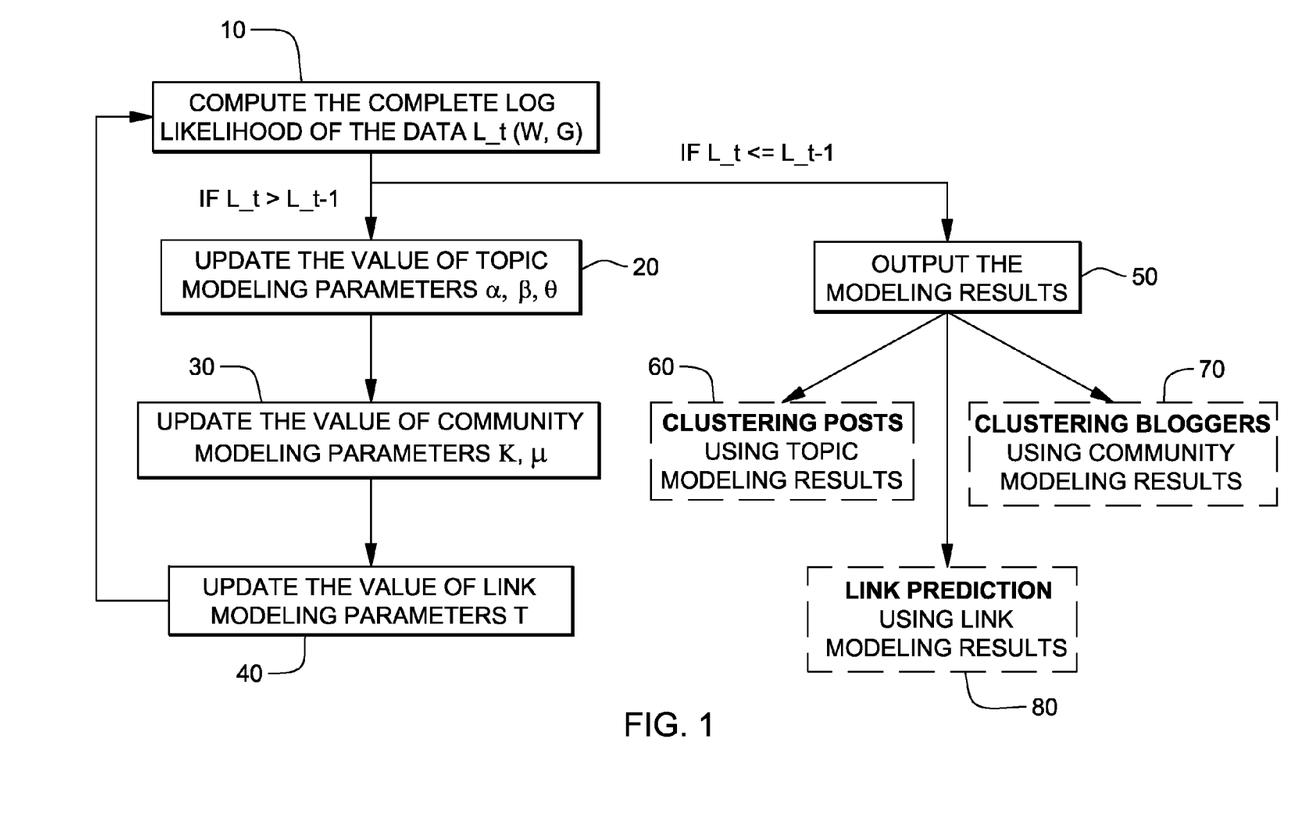
FIG. 1 illustrates a flow chart including method steps employed according to one embodiment of the present invention.

FIG. 1 illustrates a flow chart including method steps according to one embodiment of the present invention. To execute the method steps, a computing system (e.g., a system 1600 in FIG. 5) receives inputs and generates outputs after executing the method steps. The inputs include, but are not limited to:
a word vector matrix W whose size is M*N and whose elements are Boolean values, {0, 1}. In the word vector matrix W, an element $W_{i,j}$=1 represents a word j appears in an unstructured text i, and $W_{i,j}$=0 represents a word j does not appear in an unstructured text i. M is a constant representing the number of total unstructured texts (e.g., posts, comments, or texts in a web site). N is a constant representing the number of total words in the unstructured texts.
a link graph matrix G whose size is M*M and whose elements are Boolean values, {0, 1}. In the link graph matrix G, an element $G_{j,k}$=1 represents an unstructured text j links to an unstructured text k and $G_{j,k}$=0 represents the unstructured text j does not link to the unstructured text k.

The outputs include, but are not limited to:
the first prior probability matrix a whose size is 1*K and whose elements have values between 0 and 1. A sum of the values of the elements is 1. In $\alpha$, an element $\alpha_i$ represents a prior probability that an unstructured text i is related to topic i. K is a constant representing the number of hidden topics. A hidden topic refers to a topic that is discussed in the unstructured texts but has not been directly observed in the data collecting process.

the topic representation matrix $\beta$ whose size is K*N and whose elements have values between 0 and 1. A sum of the values of elements at each column is 1. In $\beta$, an element $\beta_{i,j}$ represents a degree that word j is associated with a topic i.

the document topic association matrix $\theta$ whose size is M*K and whose elements have values between 0 and 1. A sum of the values of elements at each column is 1. In $\theta$, an element $\gamma_{i,k}$ represents a degree that an unstructured text i is associated with a topic k.

the second prior probability matrix $\kappa$ whose size is 1*P and whose elements have values between 0 and 1. A sum of the values of the elements is 1. In $\kappa$, an element $\kappa_i$ represents a prior probability that an entity (e.g., blogger) belongs to a community i. P is a constant representing the number of entities.

the entity community association matrix $\mu$ whose size is P*H and whose elements have values between 0 and 1. A sum of the values of elements at each column is 1. In $\mu$, an element $\mu_{j,k}$ represents a degree that an entity j is associated with a community k. H is a constant representing the number of hidden community. A hidden community refers to friendship or partnership that has been existed between entities but has not been observed in the data collection process due to a privacy issue or other issues.

the link generation parameter $\tau$: if $w_{i,j}=f(\mu, \theta, \tau)$, $\tau$ is a parameter of a function f. $\tau$ determines a degree that community similarity (friendship) and topic similarity contribute to an existence or non-existence of a link between an unstructured text i and an unstructured text j. For example, f is a linear function and $\tau$ is a coefficient of similarities.

The first prior probability matrix $\alpha$, the topic representation matrix $\beta$ and the document topic association matrix $\theta$ are related to the topic modeling and/or topic similarity between unstructured texts (e.g., blogs or posts) between entities. The second prior probability matrix $\kappa$ and the entity community association matrix $\mu$ are related to community modeling (i.e., finding friendship or partnership between entities) and/or community similarity between entities. The link generation parameter $\tau$ is related to the edge generation.

Returning to FIG. 1, the computing system receives the input data matrices W and G from a user or a computing apparatus (e.g., IBM® ThinkPad®) via a network (e.g., Internet). At step 10, the computing system computes a current log likelihood of the input data, L_t (W,G). In one embodiment, the computing system computes a probability (likelihood) of the input data (e.g., when flipping a coin, a probability of head is 0.5 and a probability of tail is 0.5) and then computes log likelihood of the input data, e.g., by computing $\log_2$ or $\log_{10}$ of the probability of the input data. The log likelihood of the input data may be a probability distribution function of parameters such as P(W, $\alpha$, $\beta$, $\theta$)*P($\kappa$, $\mu$)*P(G|$\theta$, $\mu$, $\tau$) where P(W, $\alpha$, $\beta$, $\theta$) and P($\kappa$, $\mu$) are probability distribution functions, and P(G|$\theta$, $\mu$, $\tau$)=f(G|$\theta^T\theta$, $\mu^T\mu$, $\tau$) where f can be any probability distribution function. The current log likelihood refers to a log likelihood of the input data at a present iteration. In a further embodiment, the computing system computes the current log likelihood of the input data based on a probability distribution (e.g., a well-known direchlet distribution or multinomial distribution) of the input data.

Then, the computing system compares the current log likelihood L_t and a previous log likelihood L_t−1 computed at a previous iteration. (Initially, L_t−1 may be set to zero.) If L_t is larger than L_t−1, then the computing system executes steps 20-40 and returns to a next iteration step 10. Executing steps 20-40 and 10 once may be considered as an iteration. Steps 20-40 and 10 may be repeated until L_t becomes less than or equal to L_t−1.

At step 20, the computing system updates the values of topic modeling parameters, $\alpha$, $\beta$, $\theta$. In one embodiment, "updating" may refer to estimating expected values of parameters for topic modeling. The expected value of $\alpha$, E[$\alpha$], is estimated by computing $\int \alpha P(\alpha)d\alpha$, where P($\alpha$) is a distribution of $\alpha$ and is a probability distribution function (e.g., Dirichlet distribution function) of other parameters such as P($\alpha$)=g($\theta$, $\mu$, $\beta$, $\tau$)($\alpha$). The expected values of $\beta$, E[$\beta$], is estimated by computing $\int \beta P(\beta)d\beta$, where P($\beta$) is a distribution of $\beta$ and is a probability distribution function of other parameters such as P($\beta$)=h($\theta$, $\mu$, $\alpha$, $\tau$)($\beta$). The expected values of $\theta$, E[$\theta$] is estimated by computing $\int \theta P(\theta)d\theta$, where P($\theta$) is a distribution of $\theta$ and is a probability distribution function of other parameters such as P($\theta$)=l($\theta$, $\mu$, $\alpha$, $\tau$) ($\theta$).

In a further embodiment, the value of $\alpha$ is computed by $\alpha_{new}$=argmax L($\alpha$). L($\alpha$) is a log likelihood function of $\alpha$ and only includes variables and other parameters. "argmax" stands for an argument of maximum, the value of a given argument for which a value of a given expression attains a maximum value. In other words, argmax s(x) is a value of x for which s(x) has the largest value. The value of $\beta$ is computed by $\beta_{new}$=argmax L($\beta$). L($\theta$) is a log likelihood function of $\theta$ and only includes variables and other parameters. The value of $\theta$ is computed by $\theta_{new}$=argmax L($\theta$). L($\theta$) is a log likelihood function of $\theta$ and only includes variables and other parameters.

Returning to FIG. 1, at step 30, the computing system updates community modeling parameters, $\kappa$ and $\mu$. In one embodiment, "updating" may refer to estimating expected values of parameters for the community modeling. The expected value of $\kappa$, E[$\kappa$], is estimated by computing $\int \kappa P(\kappa)d\kappa$, where P($\kappa$) is a distribution of $\kappa$ and is a probability distribution function (e.g., Multinomial distribution function) of other parameters such as P($\kappa$)=m($\theta$, $\tau$, $\mu$) ($\kappa$). The expected value of $\mu$, E[$\mu$], is estimated by computing $\int \mu P(\mu)d\mu$, where P($\mu$) is a distribution of k and is a probability distribution function of other parameters such as P($\mu$)=n($\theta$, $\tau$, $\kappa$) ($\mu$).

In a further embodiment, the value of $\kappa$ is computed by $\kappa_{new}$=argmax L($\kappa$). L($\kappa$) is a log likelihood function of $\kappa$ and only includes variables and other parameters. The value of $\mu$ is computed by $\mu_{new}$=argmax L($\mu$). L($\mu$) is a log likelihood function of $\mu$ and only includes variables and other parameters.

Returning to FIG. 1, at step 40, the computing system updates the value of the link generation parameter $\tau$. In one embodiment, "updating" refers to calculating an optimal value of the link generation parameter $\tau$. The optimal value of $\tau$ is a value of $\tau$ that maximizes the log likelihood of the input data. In a farther embodiment, the value of $\kappa$ is computed by $\tau_{new}$=argmax L($\tau$). L($\tau$) is a log likelihood function of $\tau$ and only includes variables and other parameters.

Then, the computing system re-executes the step 10 to compare the L_t and the L_t−1. If the L_t is less than or equal to L_t−1, at step 50, the computing system outputs values of the parameters at a previous iteration. These parameter values generates a maximal value of the log likelihood of the input data, e.g., L_t<=L_t−1. At step 60, the computing system constructs a graph based on the outputted values of the topic modeling parameters. For example, the computing system may construct a first graph represented by a matrix $X=\theta*\theta^T$, The first graph may represent content similarities between two unstructured texts (e.g., two blogs). When $\theta$=[0.5 0.5 0.5;

0.5 0.2 0.3; 0 0 1], X=[0.5 0.35 0; 0.35 0.29 0.3; 0 0.3 1]. Each element in the matrix X may represent a degree of content similarity between the unstructured texts. For example, X (1,2)=0.35 represents a degree of content similarity between an unstructured text 1 and an unstructured texts 2. (Higher value represents higher content similarity. It is understood that diagonal elements may be ignored.) If a threshold is 0.35, there may be an edge in the graph, an edge between an unstructured text 1 and an unstructured text 2 (assume that an edge is an unidirectional edge). Thus, the graph may include three vertexes representing three unstructured texts and only one edge between the unstructured text 1 and the unstructured text 2. The first graph generated at step 60 may indicate a relationship (content similarity) between unstructured texts written by entities.

At step 70, the computing system constructs a second graph based on the outputted values of the community modeling parameters. For example, the computing system may construct a second graph represented by a matrix $Y=\mu*\mu^T$. The second graph may represent community similarities between two entities (e.g., two users). When $\mu$=[0.5 0.5 0.5; 0.5 0.2 0.3; 0 0 1], Y=[0.5 0.35 0; 0.35 0.29 0.3; 0 0.3 1]. Each element in the matrix Y may represent a degree of friendship between the entities. For example, Y (1,2)=0.35 represents a degree of friendship between an entity 1 and an entity 2. (Higher value represents stronger friendship. It is understood that diagonal elements Y(1,1), (2,2) and (3,3) may be ignored.) If a threshold is 0.35, there may be an edge in the graph, an edge between an entity 1 and an entity 2 (assume that an edge is an unidirectional edge). Thus, the graph may include three vertexes representing three entities and only one edge between the entity 1 and the entity 2. The second graph generated at step 70 indicates relationship (e.g., friendship) between entities.

In one embodiment, the relationship refers to a partnership between entities, friendship between entities or similarities between entities.

Returning to FIG. 1, at step 80, the computing system predicts whether a link will be formed in a future given the input data matrices W and G. In one embodiment, an existence of an edge is a function f of topic similarity and community similarity. The parameter τ of the function f, i.e., how much topic similarity contributes to the formation of a link and how much for community similarity, can be estimated from the input data based on other parameters. In other words, a generation of a link in the link graph matrix G is the function f of both topic similarity and community similarity. The function f is a probability distribution function (e.g., Bernoulli distribution function). An edge is generated with a probability of the function f which is determined by the topic similarity and the community similarity.

Figure 2:
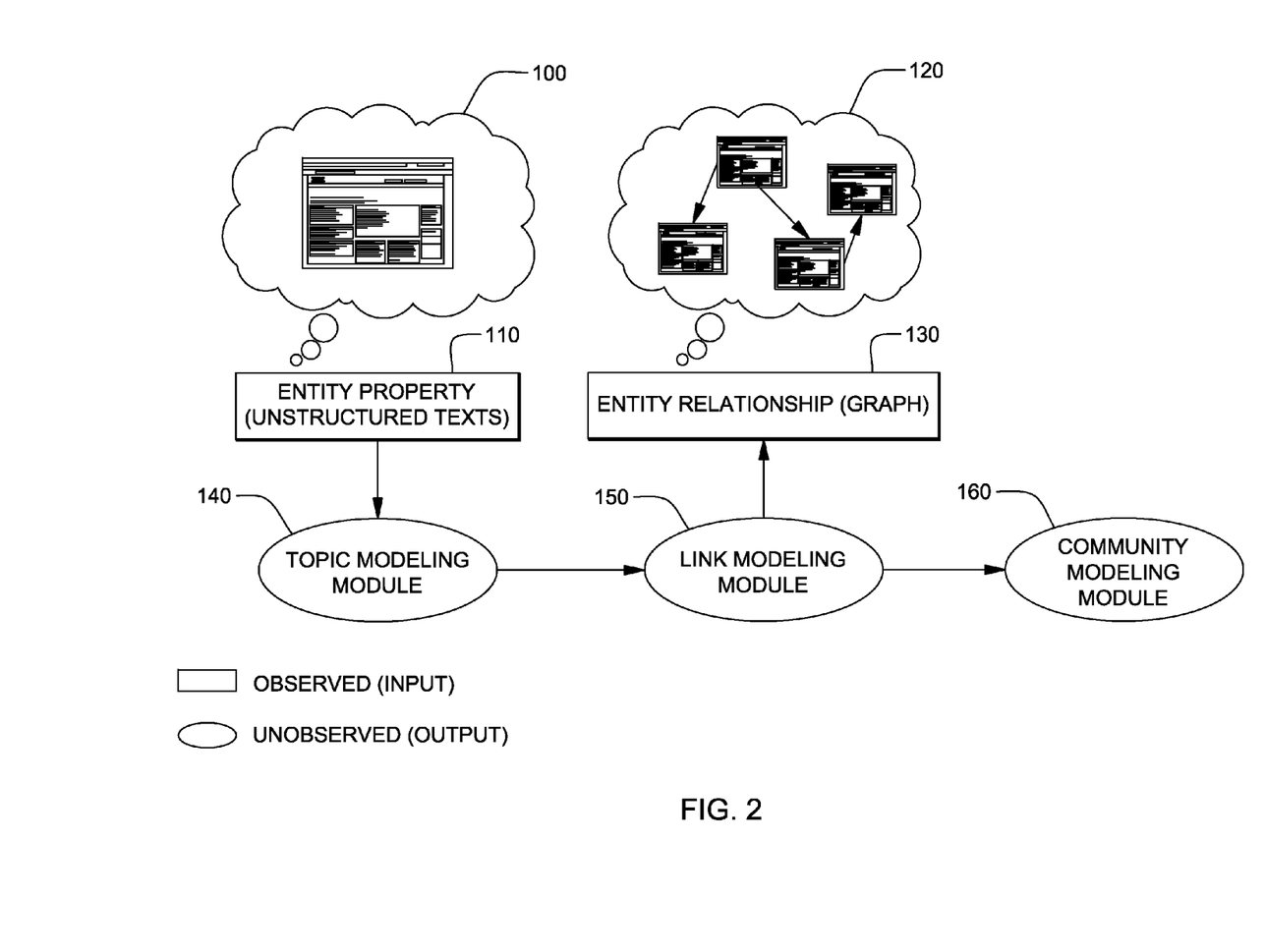
FIG. 2 illustrates a system diagram implementing the method steps according to one embodiment of the present invention.

FIG. 2 illustrates a system diagram according to one embodiment of the present invention. A topic modeling module 140 executing in a computing system or device (e.g., a computing system 1600 in FIG. 5) receives documents, e.g., an unstructured text 110 such as a text in a web page 100, extracts topics in documents, and constructs the first graph (i.e., the first graph generated at step 60 in FIG. 1) representing content similarities between documents. Topic modeling is described in Thomas Hofmann, "Probabilistic Latent Semantic Indexing", Proceeding of the Twenty-Second Annual International SIGIR Conference on Research and Development in Information Retrieval, 1999, incorporated herein by reference. David M. Blei, et al. "Latent Dirichelt Allocation", Journal of Machine Learning Research 3 (2003), p. 993-1022, Published on January, 2003, incorporated herewith by reference describes topic modeling as well as extracting topics in documents. The topic modeling module 140 constructs the first graph as the computing system constructs the first graph.

A community modeling module 160 uncovers relationships (e.g., friendship) between entities (e.g., users or companies) associated with the documents and constructs the second graph (i.e., the second graph generated at step 70 in FIG. 1) representing the relationships between the entities. The community modeling module 160 may construct the second graph as the computing system construct the second graph as the computing system constructs the second graph.

A link modeling module 150 communicates with the topic modeling module 140 and the community modeling module 160, predicts whether an edge in the first graph will be formed based on the uncovered relationships, predicts whether an edge in the second graph will be formed based on the extracted topics and constructs an entity relationship graph 130 such as a graph 120, e.g., by combining the first graph and the second graph. The entity relationship graph 130 may distinguish edges associated with friendship from edges associated with topic similarity. For example, when an edge is given by indicating "1" at an element in the link graph matrix G, the topic modeling module 140 computes content similarity associated with the link, e.g., by calculating the matrix $X=\theta*\theta^T$. If the content similarity is less than a threshold, the link modeling module 150 decides that the link exists due to friendship between two entities associated with the link. Similarly, when an edge is given, the community modeling module 160 computes community similarity associated with the edge, e.g., by calculating the matrix $Y=\mu* \mu^T$. If the community similarity is less than a threshold, the link modeling module 150 decides that the edge exists due to content similarity between two documents associated with the edge.

Figure 3:
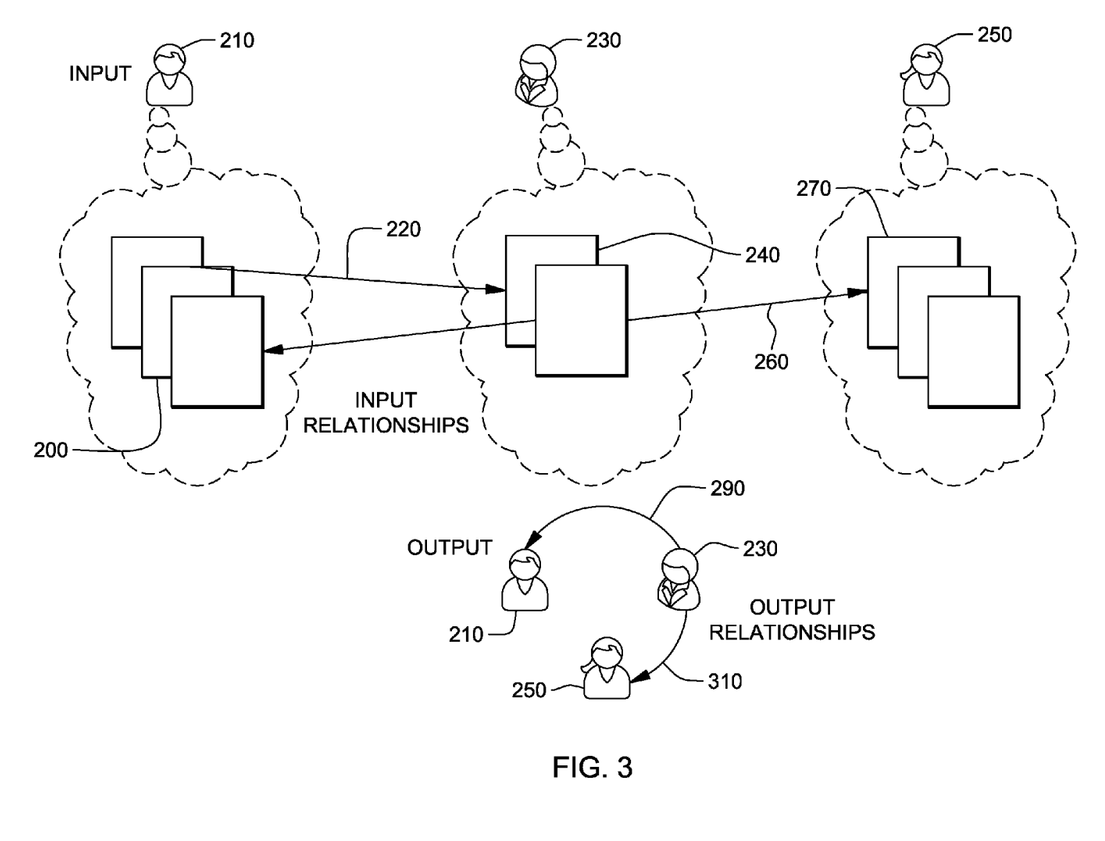
FIG. 3 illustrates exemplary input relationships and output relationships among entities according to one embodiment of the present invention.

FIG. 3 illustrates input relationships and output relationships according to one embodiment of the present invention. In this embodiment, a user may write a plurality of unstructured texts. For example, a first user 210 writes three web pages, the second user 230 writes two posts, and the third user 250 writes three comments. These unstructured texts may be interrelated via hyperlinks. For example, a web page 200 may include a hyperlink 220 connected to a post 240. A post 260 may include a hyperlink 260 connected to a comment 270. In this embodiment, these unstructured texts including the hyperlinks may be provided as inputs to the computing system or the topic modeling module 140. Then, by executing the method steps in FIG. 1, the computing system or the community modeling module 160 may generate a link between users, e.g., by constructing the second graph. For example, the second graph may include three vertexes including three users, a link 290 indicating friendship between the user 210 and the user 230 and a link 310 indicating friendship between the user 230 and the user 250.

Figure 4:
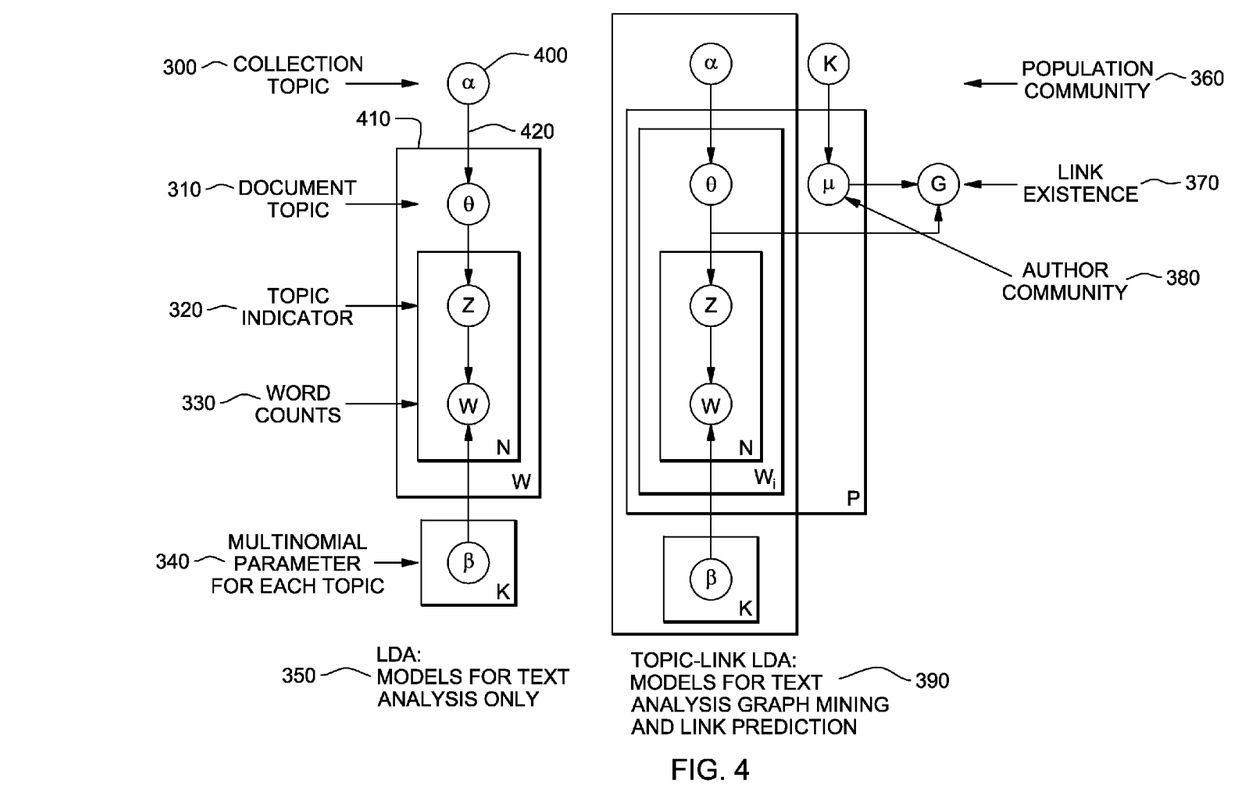
FIG. 4 illustrates LDA (Latent Dirichlet Allocation) and topic-linked LDA according to one embodiment of the present invention.

FIG. 4 illustrates an exemplary embodiment of the present invention for the blog analysis. LDA (Latent Dirichlet Allocation) model 350 and Topic-Link LDA model 390 are graphical models (i.e., graphs representing dependencies among random variables). The LDA model 350 only represents the topic modeling module 140. The Topic-Link LDA model 390 represents a unified model (e.g., FIG. 2) combining the topic modeling module 140, the link generation module 150 and the community modeling module 160. A circle with a character such as a circle 400 represents that the character is a random variable. When a rectangle (e.g., a rectangle 410) is put outside the circle, the rectangle means that there are multiple copies of variables in the rectangle (e.g. X={0, 1} may represents one coin being face-up or face-down; with two coins, X1 and X2, a rectangle can be put outside a circle with a character X). In the LDA 350 model and Topic-Link LDA model 390, the rectangle may represent that there are multiple words in one document. A word (e.g., "N", "W" or "κ") at a right-hand bottom corner in a rectangle represents the number of multiple words or copies. An edge from A to B means that a probability of B is a function of A. For example an edge 420 from α to θ means that a probability of θ is a function of α.

In the LDA model 350, "collection topic" 300 refers to conceptual (but currently unknown) topics within input data (e.g., unstructured texts). The "collection topic" 300 is represented by the parameter α. "Document topic" 310 refers to observed or known topics discussed in the input data. The "document topic" 310 is represented by the parameter θ. "Topic indicator" 320 refers to which topic a current word is associated with. The "topic indicator" 320 is represented by a parameter z. "Word counts" 330 refers to the number of words in the input data associated with a particular topic. The "word counts" is represented by a parameter w. "Multinomial parameter for each topic" 340 means representing each topic using a word vector (i.e., an array or vector of words). For example, for a topic "sports", there may be a word vector comprising NFL, baseball, etc. For a topic "politics", there may be a word vector comprising Obama, Clinton, etc. The LDA model 350 implements the following process: the LDA model 350 selects a topic (i.e., a topic indicator z), e.g., by using a document topic θ and a collection topic α. Then, the LDA model 350 uses a corresponding multinomial parameter for each topic β to selects words (i.e., word counts w) associated with the topic. The LDA model 350 may repeat this process N times, where N is the number of words in the input data.

An input of the LDA model 350 is the word vector matrix W. The LDA model 350 operates as like the topic modeling module 140 and generates the topic modeling parameters α, β, θ as outputs.

In Topic-Link LDA model 390, "population community" 360 refers to an entity-community information, i.e., which entities belong to a same community. The "population community" 360 is represented by the parameter κ. "Link existence" 370 refers to whether there is a link between inputted unstructured texts. The "link existence" 370 is represented by the link graph matrix G and/or the entity relation graph 130 (FIG. 2). "Author community" 380 means a degree that an entity is associated with a community. The "author community" 380 is represented by the parameter μ.

The Topic-Link LDA model 390 operates by executing the method steps in FIG. 1, receives the word vector matrix W and the link graph matrix G as inputs, and generates the topic modeling parameters α, β, θ, the community modeling parameters κ, μ, and the link generation parameter τ as outputs by executing the method steps in FIG. 1.

In further exemplary embodiment, P(θ) is a Dirichlet probability distribution function with the parameter α. P(z) is a Multinomial probability distribution function with the parameter θ. P(w) is a Multinomial probability distribution function with the parameter β. P(μ) is a Dirichlet probability distribution function with the parameter κ. $G_{j,k}$ is Bernolli probability distribution function with a parameter $\sigma(\rho_{i,j})$, where $\sigma(x)=1/(1+\exp(-x))$ and $\rho_{i,j}=\tau_1\mu_i^T\mu_j+\tau_2\theta_i^T\theta_j+\tau_3\cdot\sigma(\ )$ function is a sigmoid function (i.e., $1/(1+\exp(-x))$), which converts real values from negative infinity to infinity to [0,1] so that values can be used as a probability. ρ is a linear combination of topic similarity and community similarity. Thus, ρ is a linear function and is an example of the function f, which is a probability distribution function such as Dirichlet distribution function.

The present invention may be applicable to all cases where unstructured texts and entity relationship graph are available. Examples of applicable usages include the blog analysis, product recommendation, business partner analysis, etc.

Figure 5:
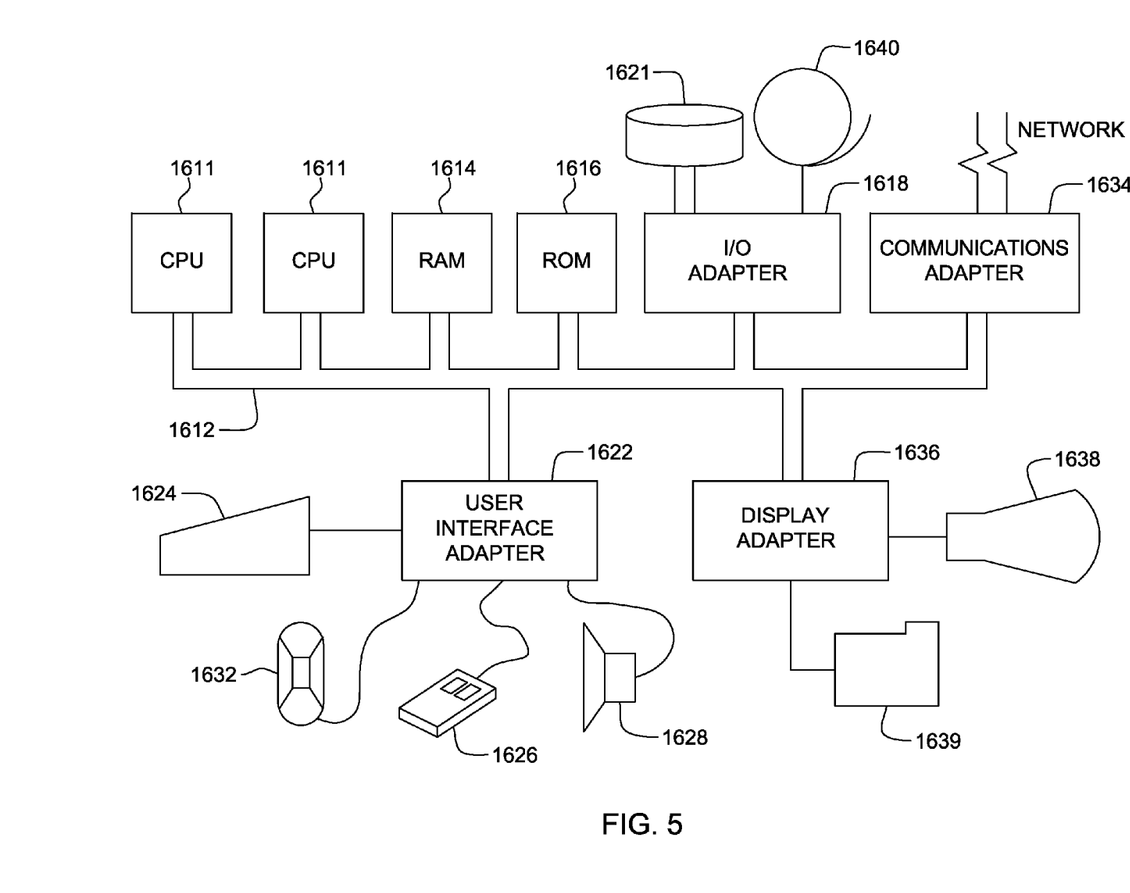
FIG. 5 illustrates a hardware configuration to implement or execute one embodiment of the present invention.

FIG. 5 illustrates a hardware configuration of a computing system 1600 (e.g., the topic modeling module 140, the link modeling module 150 and the community modeling module 160) implementing and/or executing the method steps in FIG. 2. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

In a further embodiment, the topic modeling module 140, the link modeling module 150 and the community modeling module 160 are implemented as hardware on a reconfigurable hardware, e.g., FPGA (Field Programmable Gate Array) or CPLD (Complex Programmable Logic Device), using a hardware description language (Verilog, VHDL, Handel-C, or System C). In another embodiment, the topic modeling module 140, the link modeling module 150 and the community modeling module 160 are implemented on a semiconductor chip, e.g., ASIC (Application-Specific Integrated Circuit), using a semi custom design methodology, i.e., designing a chip using standard cells and a hardware description language.

In a further embodiment, the topic modeling module 140, the link modeling module 150 and the community modeling module 160 are implemented as software using one or more programming languages, e.g., C, C++, Java, .NET, Perl, Python, etc. In one embodiment, the topic modeling module 140, the link modeling module 150 and the community modeling module 160 are recorded in a computer readable medium, e.g., CD (Compact Disc), DVD (Digital Versatile Disc), HDD (Hard Disk Drive), SSD (Solid State Drive), as an instruction, e.g., a machine language or assembly language, that is executed by a processor, e.g., Intel® Core®, IBM® Power PC®, AMD®Opteron®.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) executed by a processor (e.g., Intel® Core™ 2, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented system for discovering communities, the system comprising:
   a computer-implemented topic modeling module for receiving documents as inputs, extracting topics in the documents, and constructing a first graph representing content similarities between the documents, said constructing comprising generating values of two or more parameters for topic modeling;
   a computer-implemented community modeling module for uncovering relationships between entities associated with the documents and constructing a second graph representing the relationships between entities, said constructing comprising generating values of two or more community modeling parameters; and
   a computer-implemented link modeling module for communicating with the topic-modeling module and the community modeling module, and predicting whether an edge in the first graph will be formed based on the uncovered relationship, predicting whether an edge in the second graph will be formed based on the extracted topics, and constructing an entity relationship graph based on the first graph and the second graph,
   wherein a community grouping for an entity is a variable hidden from a data collection process, said constructing said entity relationship graph comprising:
   implementing a model that iterates until convergence:
      estimating expected values of community hidden variables given current parameters for topic modeling and community modeling parameter;
      updating values of said parameters for said topic modeling; and
      updating values of said parameters for edge generation,
   using said model for said edge predicting, wherein resulting edges of said entity relationship graph associated with an entity friendship or partnering relationship are distinguished from edges of said entity relationship graph associated with topic similarity.

2. A computer system for discovering a relationship between entities comprising:
   a memory;
   a processor in communications with the memory, wherein the computer system is configured for performing a method comprising:
      receiving input data W representing a word vector matrix and input data G representing a link graph matrix having values that capture relationships amongst user or business entities;
      computing a current log likelihood of the input data W and G, the current likelihood of the input data being a probability distribution function of topic modeling parameters and community modeling parameters, the parameters representing topic similarity between unstructured texts of the entities and the community modeling parameters represent community similarity between the entities; comparing the current log likelihood of the input data and a previous log likelihood of the input data computed previously;
      updating values of the parameters, if the current log likelihood is larger than the previous log likelihood;
      repeating the comparing and the updating until the current log likelihood becomes less than or equal to the previous log likelihood; and
      constructing at least one graph based on the updated values of the parameters, if the current log likelihood is less than or equal to the previous log likelihood, the at least one graph indicating the relationship between the entities.

3. The computer system according to claim 2, wherein the relationship comprises: a partnership between the entities, a friendship between the entities, and a similarity between the entities.

4. The computer system according to claim 2, wherein the updating comprises:
   estimating expected values of topic modeling parameters representing the topic similarity, the topic modeling parameters including $\alpha, \beta, \theta$, wherein the $\alpha$ represents a first prior probability matrix whose elements representing prior probabilities that unstructured texts of the entities is related to topics, the β represents a topic representation matrix whose elements representing degrees that words in the unstructured texts represented by the document word matrix W is associated with the topics, and the θ represents a document topic association matrix whose elements representing degrees that the unstructured texts of the entities are associated with the topics.

5. The computer system according to claim 4, wherein
the expected value of α, E[α], is estimated by computing ∫αP(α)dα, where P(α) is a distribution of α,
the expected values of β, E[β], is estimated by computing ∫βP(β)dβ, where P(β) is a distribution of β, and
the expected values of θ, E[θ] is estimated by computing ∫θP(θ)dθ, where P(θ) is a distribution of θ.

6. The computer system according to claim 2, wherein the updating comprises:
estimating expected values of community modeling parameters representing the community similarity, the community modeling parameters including κ, μ, wherein the κ represents a second prior probability matrix whose elements representing prior probabilities that entities belongs communities, and the μ represents an entity community association matrix whose elements representing a degree that the entities associated with the communities.

7. The computer system according to claim 6, wherein
the expected value of κ, E[κ], is estimated by computing ∫κP(κ)dκ, where P(κ) is a distribution of κ, and
the expected value of μ, E[μ], is estimated by computing ∫μP(μ)dμ, where P(μ) is a distribution of k.

8. The computer system according to claim 2, wherein the updating comprises:
calculating an optimal value of a link generation parameter, τ.

9. The computer system according to claim 8, wherein the optimal value of the link generation parameter τ is a value of τ that maximize the log likelihood of the input data.

10. A computer readable medium embodying computer program instructions being executed by a processor for causing a computer to perform method steps for clustering entities, said medium not a propagating signal, said method steps comprising:
receiving documents as inputs, extracting topics in the documents, and constructing a first graph representing content similarities between the documents, said constructing comprising generating values of two or more parameters for topic modeling;
uncovering relationships between entities associated with the documents and constructing a second graph representing the relationships between entities, said constructing comprising generating values of two or more community modeling parameters; and
predicting whether an edge in the first graph will be formed based on the uncovered relationship, and predicting whether an edge in the second graph will be formed based on the extracted topics, and constructing an entity relationship graph based on the first graph and the second graph,
wherein a community grouping for an entity is a variable hidden from a data collection process, said constructing said entity relationship graph comprising:
implementing a model that iterates until convergence:
estimating expected values of community hidden variables given current parameters for topic modeling and community modeling parameter;
updating values of said parameters for said topic modeling; and
updating values of said parameters for edge generation, using said model for said edge predicting, wherein resulting edges of said entity relationship graph associated with an entity friendship or partnering relationship are distinguished from edges of said entity relationship graph associated with topic similarity.

11. A computer program product comprising computer usable medium having computer readable program code means embodied therein for causing functions to cluster entities, said medium not a propagating signal, the computer program code means in said computer program product for causing a computer to perform a method comprising
receiving input data W representing a word vector matrix and input data G representing a link graph matrix having values that capture relationships amongst user or business entities;
computing a current log likelihood of the input data W and G, the current likelihood of the input data being a probability distribution function of topic modeling parameters and community modeling parameters, the parameters representing topic similarity between unstructured texts of the entities and the community modeling parameters represent community similarity between the entities; comparing the current log likelihood of the input data and a previous log likelihood of the input data computed previously;
updating values of the parameters, if the current log likelihood is larger than the previous log likelihood;
repeating the comparing and the updating until the current log likelihood becomes less than or equal to the previous log likelihood; and
constructing at least one graph based on the updated values of the parameters, if the current log likelihood is less than or equal to the previous log likelihood, the at least one graph indicating the relationship between the entities.

12. The computer program product of claim 11, wherein said constructing at least one graph comprises:
constructing a first graph representing content similarities between the documents; and
constructing a second graph indicating said relationship between the entities associated with the documents, said method further comprising:
predicting whether an edge in the constructed first graph will be formed based on an uncovered relationship,
predicting whether an edge in the second graph will be formed based on extracted topics, and
constructing an entity relationship graph based the first graph and the second graphs.

13. The computer program product of claim 12, wherein weights of edges in said entity relationship graph that link between entities of different similarities are processed differently to uncover communities having community similarity.

14. The computer program product of claim 12, wherein the updating comprises:
calculating an optimal value of a link generation parameter τ that determines a degree that community similarity and topic similarity contribute to an existence or non-existence of a link between an unstructured text i and an unstructured text j of the entities.

* * * * *